United States Patent [19]
DiFilippo

[11] Patent Number: 5,664,480
[45] Date of Patent: Sep. 9, 1997

[54] CUSTOM COFFEE BREWING SYSTEM

[76] Inventor: Philip P. DiFilippo, 19 Ackland Street, Stoney Creek Ontario, Canada, L8J 1H5

[21] Appl. No.: 671,005

[22] Filed: Jun. 28, 1996

[51] Int. Cl.⁶ .................................................. A23F 5/24
[52] U.S. Cl. ................................................ 99/299; 99/306
[58] Field of Search .................. 99/279, 306, 299, 99/295, 287, 300, 304, 305; 426/433; 210/478, 481, 474, 477

[56] References Cited

U.S. PATENT DOCUMENTS

| | | | |
|---|---|---|---|
| 3,985,069 | 10/1976 | Cavalluzzi | 99/306 |
| 4,656,932 | 4/1987 | Kopp | 99/306 |
| 5,085,135 | 2/1992 | Collignon | 99/299 |
| 5,424,083 | 6/1995 | Lozito | 426/433 |

*Primary Examiner*—Reginald Alexander

[57] ABSTRACT

A new Custom Coffee Brewing System for facilitating custom coffee brewing where the user adjusts the strength of the coffee depending on taste preference. The inventive device includes a coffee retaining cone supporting a standard coffee filter, and a plunger member slidably connected to the coffee retaining cone.

3 Claims, 3 Drawing Sheets

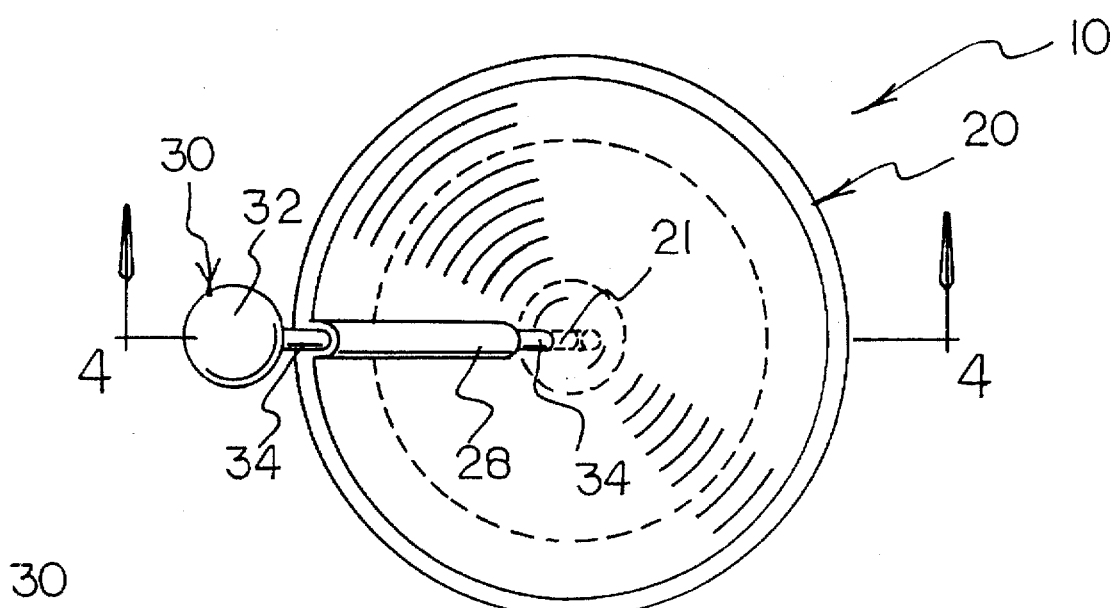
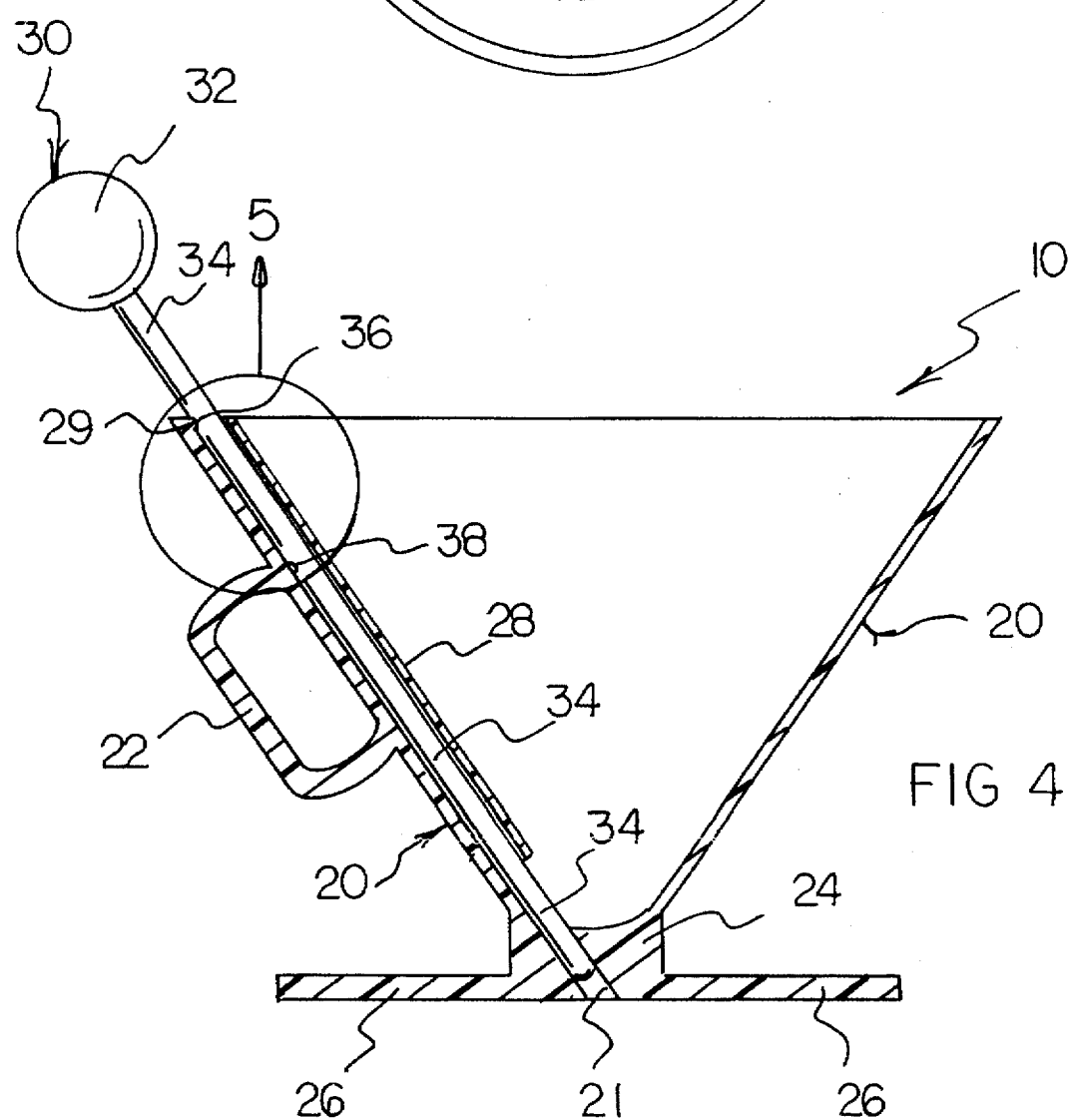

CUSTOM COFFEE BREWING SYSTEM

BACKGROUND OF THE INVENTION

1. Field of the Invention

The present invention relates to Coffee Devices and more particularly pertains to a new Custom Coffee Brewing System for facilitating custom coffee brewing where the user adjusts the strength of the coffee depending on taste preference.

2. Description of the Prior Art

The use of Coffee Devices is known in the prior art. More specifically, Coffee Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Coffee Devices include U.S. Pat. No. 4,913,916; U.S. Pat. No. 4,986,172; U.S. Design Pat. No. 350,868; U.S. Pat. No. 5,440,972; U.S. Pat. No. 4,862,695 and U.S. Pat. No. 4,843,955.

While these devices fulfill their respective, particular objectives and requirements, the aforementioned patents do not disclose a new Custom Coffee Brewing System. The inventive device includes a coffee retaining cone supporting a standard coffee filter, and a plunger member slidably connected to the coffee retaining cone.

In these respects, the Custom Coffee Brewing System according to the present invention substantially departs from the conventional concepts and designs of the prior art, and in so doing provides an apparatus primarily developed for the purpose of facilitating custom coffee brewing where the user adjusts the strength of the coffee depending on taste preference.

SUMMARY OF THE INVENTION

In view of the foregoing disadvantages inherent in the known types of Coffee Devices now present in the prior art, the present invention provides a new Custom Coffee Brewing System construction wherein the same can be utilized for facilitating custom coffee brewing where the user adjusts the strength of the coffee depending on taste preference.

The general purpose of the present invention, which will be described subsequently in greater detail, is to provide a new Custom Coffee Brewing System apparatus and method which has many of the advantages of the Coffee Devices mentioned heretofore and many novel features that result in a new Custom Coffee Brewing System which is not anticipated, rendered obvious, suggested, or even implied by any of the prior art Coffee Devices, either alone or in any combination thereof.

To attain this, the present invention generally comprises a coffee retaining cone supporting a standard coffee filter, and a plunger member slidably connected to the coffee retaining cone.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Custom Coffee Brewing System apparatus and method which has many of the advantages of the Coffee Devices mentioned heretofore and many novel features that result in a new Custom Coffee Brewing System which is not anticipated, rendered obvious, suggested, or even implied by any of the prior art Coffee Devices, either alone or in any combination thereof.

It is another object of the present invention to provide a new Custom Coffee Brewing System which may be easily and efficiently manufactured and marketed.

It is a further object of the present invention to provide a new Custom Coffee Brewing System which is of a durable and reliable construction.

An even further object of the present invention is to provide a new Custom Coffee Brewing System which is susceptible of a low cost of manufacture with regard to both materials and labor, and which accordingly is then susceptible of low prices of sale to the consuming public, thereby making such Custom Coffee Brewing System economically available to the buying public.

Still yet another object of the present invention is to provide a new Custom Coffee Brewing System which provides in the apparatuses and methods of the prior art some of the advantages thereof, while simultaneously overcoming some of the disadvantages normally associated therewith.

Still another object of the present invention is to provide a new Custom Coffee Brewing System for facilitating custom coffee brewing where the user adjusts the strength of the coffee depending on taste preference.

Yet another object of the present invention is to provide a new Custom Coffee Brewing System which includes a coffee retaining cone supporting a standard coffee filter, and a plunger member slidably connected to the coffee retaining cone.

Still yet another object of the present invention is to provide a new Custom Coffee Brewing System that allows the user to custom brew coffee to their individual taste.

Even still another object of the present invention is to provide a new Custom Coffee Brewing System that provides efficient use of coffee grounds thereby utilizing less coffee grounds to prepare a cup of coffee.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top view of the present invention showing the elongated plunger rod projecting through the plunger tube.

FIG. 4 is a cross sectional view taken along line 4—4 of FIG. 3 further disclosing the elongated plunger rod projecting through the plunger tube.

DESCRIPTION OF THE PREFERRED EMBODIMENT

Figure 1:
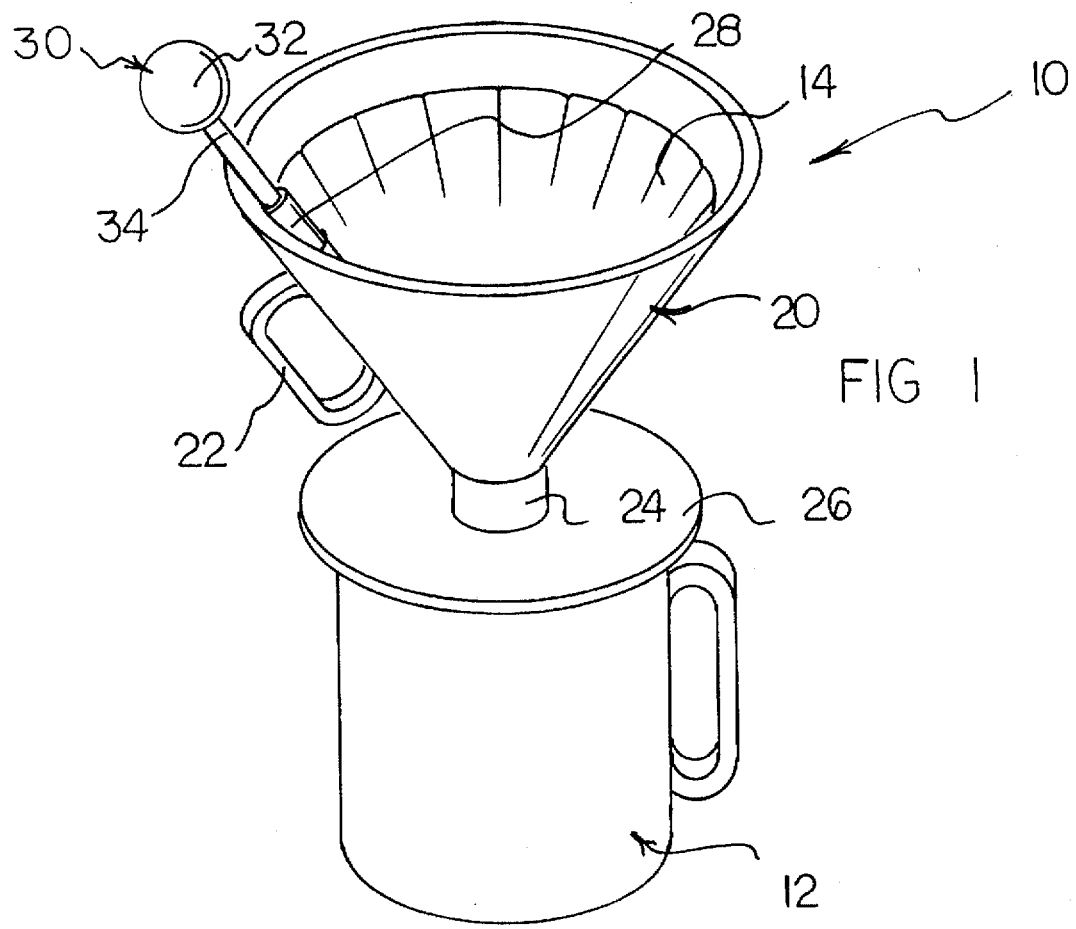
FIG. 1 is a side perspective view of a new Custom Coffee Brewing System showing the plunger member interacting with the coffee retaining cone according to the present invention.
Figure 2:
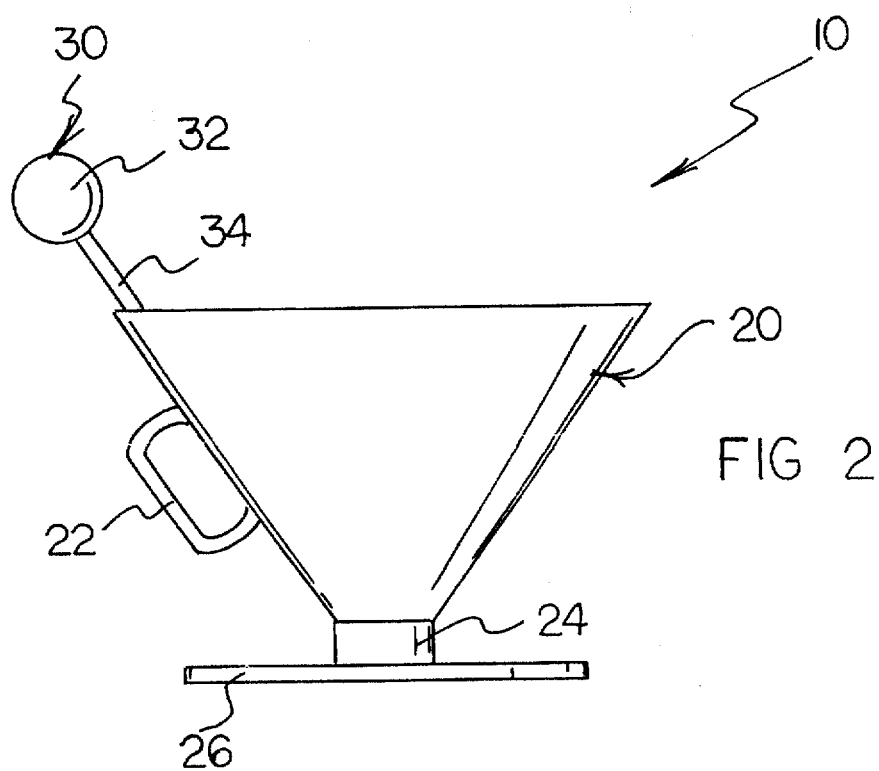
FIG. 2 is a side view thereof.

With reference now to the drawings, and in particular to FIGS. 1 through 6 thereof, a new Custom Coffee Brewing System embodying the principles and concepts of the present invention and generally designated by the reference numeral 10 will be described.

More specifically, it will be noted that the Custom Coffee Brewing System 10 comprises a coffee retaining cone 20 formed to retain a standard coffee filter 14 and a plunger member 30 slidably engaging the coffee retaining cone 20.

Figure 5:
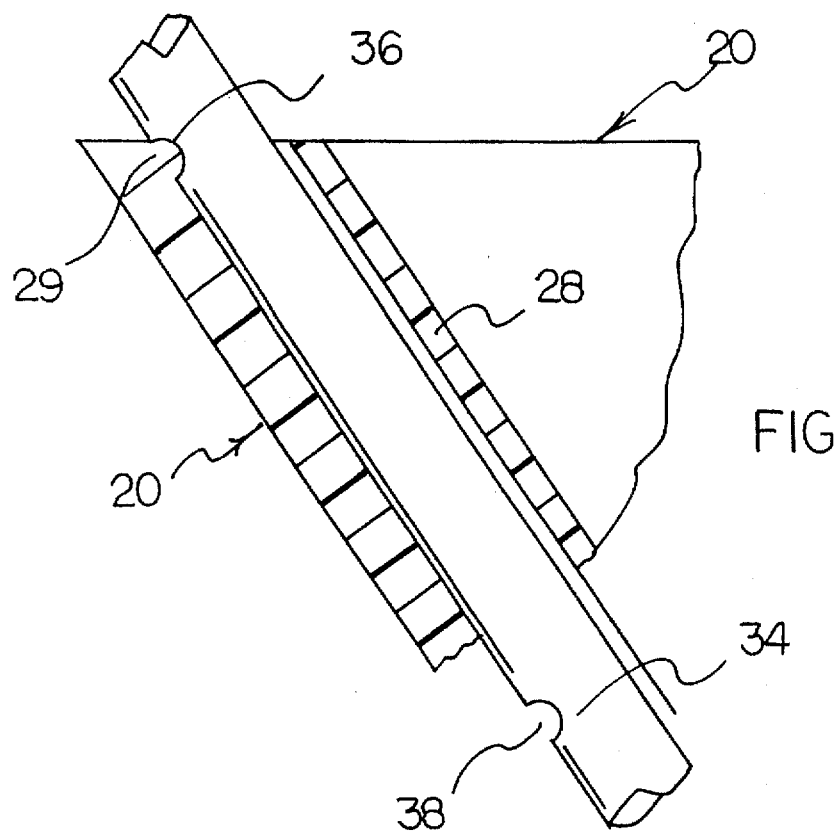
FIG. 5 is a magnified view of the locking ridge projecting into the closing notch of FIG. 3.

As best illustrated in FIGS. 1 through 6, it can be shown that the plunger member 30 includes an elongated plunger rod 34. A plunger handle 12 is secured to one end of the elongated plunger rod 34 as best shown in FIG. 4 of the drawings. The elongated plunger rod 34 includes a closing notch 36 near the plunger handle 32 as best shown in FIG. 5 of the drawings. The elongated plunger rod 34 includes an opening notch 38 between the closing notch 36 and the end of the elongated plunger rod 34 opposite of the plunger handle 32 allowing the user lock the elongated plunger rod 34 as best shown in FIG. 4 of the drawings. The coffee retaining cone 20 includes a handle 22 secured to the exterior surface of the coffee retaining cone 20. A neck member 24 is secured to the narrow end of the coffee retaining cone 20 as best shown in FIG. 4 of the drawings. A base member 26 is secured to the neck member 24 opposite of the coffee retaining cone 20, where the base member 26 is formed to engage the top of a cup 12 as best shown in FIG. 1 of the drawings. A plunger tube 28 is secured to the interior side of the coffee retaining cone 20 projecting from near the upper edge along the interior wall of the coffee retaining cone 20 to near the narrow end of the coffee retaining cone 20. The plunger tube 28 is secured to the coffee retaining cone 20 at a predetermined angle. A locking ridge 29 is secured to the upper edge of the coffee retaining cone 20 above the plunger tube 28. The locking ridge 29 projects into the either the closing notch or the opening notch 38 locking the plunger member 30 in place. The coffee retaining cone further includes a water outlet passage 21 through the narrow end at the predetermined angle. The neck member 24 and base member 26 both include the water outlet passage 21 where the elongated plunger rod 34 slidably projects into as best shown in FIG. 4 of the drawings. The elongated plunger rod 34 slidably projects through the plunger tube 28 and further projects through the water outlet passage 21 preventing water from flowing through the water outlet passage 21.

Figure 6:
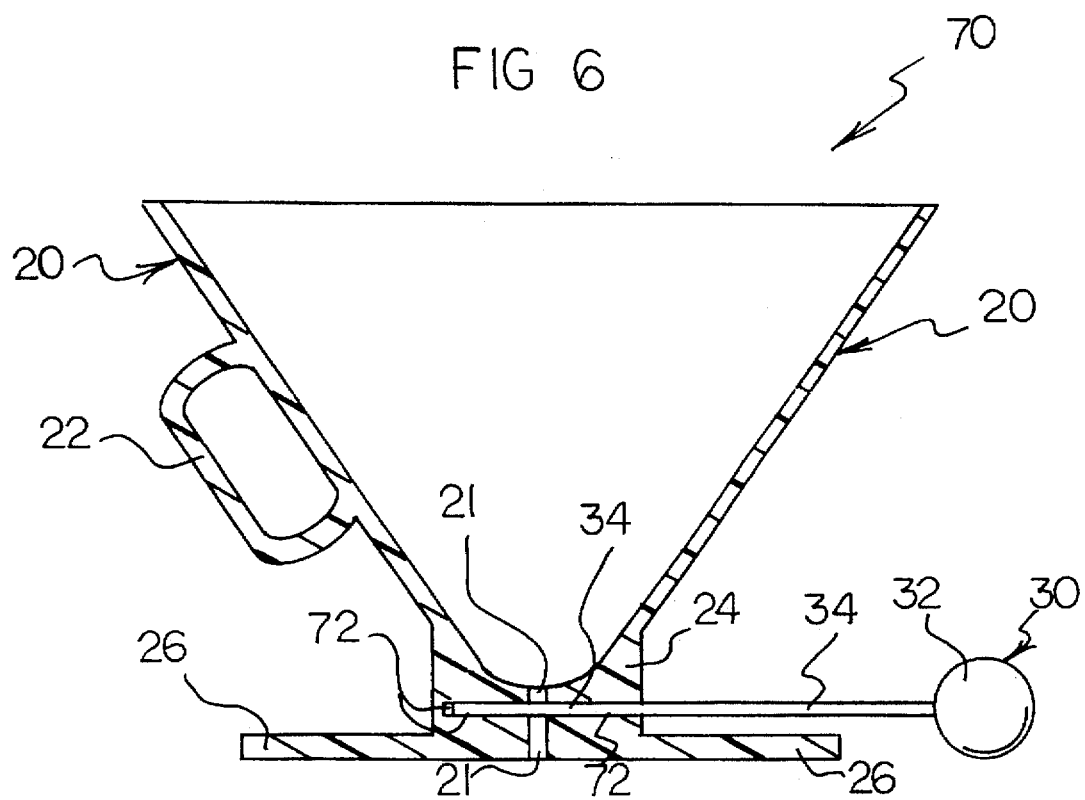
FIG. 6 is an alternative embodiment of the present invention disclosing the horizontal plunger passage surrounding the elongated plunger rod.

In an alternative coffee retaining cone 70 as shown in FIG. 6 of the drawings, the coffee retaining cone 20 includes a handle 22 secured to the exterior surface of the coffee retaining cone 20, a neck member 24 secured to the narrow end of the coffee retaining cone 20, and a base member 26 secured to the neck member 24 opposite of the coffee retaining cone 20. A water outlet passage 21 projects vertically through the narrow end of the coffee retaining cone 20, further vertically through the neck member 24 and further vertically through the base member 26. The neck member 24 includes a horizontal plunger passage 72 projecting into one side of the neck member 24 centrally through the water outlet passage 21 and terminating near the opposite side of the neck member 24. The elongated plunger rod 34 slidably projects through the horizontal plunger passage 72 preventing water from flowing through the water outlet passage 21.

In use, the user places the present invention on top of the cup 12. The user then places the standard coffee filter 14 inside the interior of the coffee retaining cone 20, puts in the desire amount of the unnumbered coffee grounds inside of the standard coffee filter 14, and then pours hot water into the coffee retaining cone 20. The user places the closing notch 36 to engage the locking ridge 29. When the coffee is at the desired strength, the user then slides the elongated plunger rod 34 so the opening notch 38 engages the locking ridge 29 whereby the plunger rod 34 is removed from the water outlet passage 21 sufficiently to allow passage of the coffee into the cup 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Custom Coffee Brewing System comprising:

a coffee retaining cone formed to retain a standard coffee filter;

a plunger member slidably engaging the coffee retaining cone; and the plunger member includes:

an elongated plunger rod;

a plunger handle secured to one end of the elongated plunger rod;

the elongated plunger rod including a closing notch near the plunger handle; and the elongated plunger rod including an opening notch between the closing notch and the end of the elongated plunger rod opposite of the plunger handle.

2. The Custom Coffee Brewing System of claim 1, wherein the coffee retaining cone includes:

a handle secured to the exterior surface of the coffee retaining cone;

a neck member secured to the narrow end of the coffee retaining cone;

a base member secured to the neck member opposite of the coffee retaining cone, where the base member is formed to engage a top of a cup;

a plunger tube secured to the interior side of the coffee retaining cone projecting from near the upper edge along the interior wall of the coffee retaining cone to near the narrow end of the coffee retaining cone, where the plunger tube is secured to the coffee retaining cone at a predetermined angle;

a locking ridge secured to the upper edge of the coffee retaining cone above the plunger tube, where the locking ridge projects into the either the closing notch or the opening notch;

a water outlet passage through the narrow end at the predetermined angle, further through the neck member and further through the base member; and the elongated plunger rod slidably projecting through the plunger tube and further projecting through the water outlet passage preventing water from flowing through the water outlet passage.

3. The Custom Coffee Brewing System of claim 1, wherein the coffee retaining cone includes:

a handle secured to the exterior surface of the coffee retaining cone;

a neck member secured to the narrow end of the coffee retaining cone;

a base member secured to the neck member opposite of the coffee retaining cone;

a water outlet passage vertically through the narrow end of the coffee retaining cone, further vertically through the neck member and further vertically through the base member;

the neck member including a horizontal plunger passage projecting into one side of the neck member centrally through the water outlet passage and terminating near the opposite side of the neck member; and the elongated plunger rod slidably projecting through the horizontal plunger passage preventing water from flowing through the water outlet passage.

* * * * *